US011469673B2

(12) United States Patent
Traube

(10) Patent No.: US 11,469,673 B2
(45) Date of Patent: Oct. 11, 2022

(54) HYSTERESIS-CONTROLLED DC-DC BOOST CONVERTER FOR AERIAL VEHICLES

(71) Applicant: Amazon Technologies, Inc., Seattle, WA (US)

(72) Inventor: Joshua White Traube, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 460 days.

(21) Appl. No.: 16/740,305

(22) Filed: Jan. 10, 2020

(65) Prior Publication Data

US 2020/0153340 A1 May 14, 2020

Related U.S. Application Data

(63) Continuation of application No. 15/717,087, filed on Sep. 27, 2017, now Pat. No. 10,536,078.
(Continued)

(51) Int. Cl.
*H02M 3/158* (2006.01)
*B64C 39/02* (2006.01)
(Continued)

(52) U.S. Cl.
CPC .......... *H02M 3/1584* (2013.01); *B64C 27/14* (2013.01); *B64C 39/024* (2013.01); *B64D 31/00* (2013.01);
(Continued)

(58) Field of Classification Search
CPC ............. H02M 3/1584; H02M 3/1563; H02M 3/1588; B64C 27/14; B64C 39/024;
(Continued)

(56) References Cited

U.S. PATENT DOCUMENTS

| 4,959,602 A | 9/1990 | Scott et al. |
| 2007/0052397 A1 | 3/2007 | Thompson et al. |

(Continued)

FOREIGN PATENT DOCUMENTS

| CN | 101710713 A | 5/2010 |
| CN | 104756383 A | 7/2015 |

(Continued)

OTHER PUBLICATIONS

Costa, Levy; Buticchi, Giampaolo; and Liserre, Marco. "A Fault-Tolerant Series-Resonant DC-DC Converter," IEEE Transactions on Power Electronics, vol. 32, No. 2, Feb. 2017.
(Continued)

*Primary Examiner* — Valentina Xavier
(74) *Attorney, Agent, or Firm* — Athorus, PLLC

(57) ABSTRACT

A power conversion unit may include two or more power modules for providing high-voltage direct current power to electrical loads, such as one or more propulsion motors aboard an aerial vehicle. Each of the power modules may be controlled by hysteresis, and may include one or more pairs of transistors that are switched by a gate driver with respect to differences between a reference current and a sensed current passing through a boost inductor. The number, size and shape of the power modules may be selected to accommodate the electrical loads, and may be switched on or off, as necessary. The power conversion unit may feature at least one more power module than is required to meet all anticipated electrical loads, thereby ensuring that the power conversion unit may continue to provide power even in the event that one of the power modules experiences a fault of any kind.

20 Claims, 10 Drawing Sheets

Related U.S. Application Data

(60) Provisional application No. 62/501,701, filed on May 4, 2017.

(51) Int. Cl.
   *B64C 27/14* (2006.01)
   *B64D 31/00* (2006.01)
   *H02P 7/29* (2016.01)
   *H02P 7/291* (2016.01)
   *H02M 3/156* (2006.01)
   *H02P 31/00* (2006.01)
   *B64C 27/08* (2006.01)

(52) U.S. Cl.
   CPC ............ *H02M 3/1563* (2013.01); *H02P 7/29* (2013.01); *H02P 7/291* (2016.02); *H02P 7/2913* (2013.01); *H02P 31/00* (2013.01); *B64C 27/08* (2013.01); *B64C 2201/024* (2013.01); *B64C 2201/027* (2013.01); *B64C 2201/042* (2013.01); *B64C 2201/066* (2013.01); *B64C 2201/108* (2013.01)

(58) Field of Classification Search
   CPC .............. B64C 27/08; B64C 2201/024; B64C 2201/027; B64C 2201/042; B64C 2201/066; B64C 2201/108; B64D 31/00; H02P 7/29; H02P 7/291; H02P 7/2913; H02P 31/00; Y02B 70/10
   See application file for complete search history.

(56) References Cited

U.S. PATENT DOCUMENTS

| | | |
|---|---|---|
| 2012/0075544 A1 | 3/2012 | Sasaki |
| 2014/0097290 A1 | 4/2014 | Leng |
| 2014/0111170 A1* | 4/2014 | Shi ...................... H02M 3/1588 323/271 |
| 2015/0180355 A1 | 6/2015 | Freeman et al. |
| 2015/0381039 A1 | 12/2015 | Hari et al. |
| 2016/0090184 A1 | 3/2016 | Ghoshal |
| 2018/0109183 A1* | 4/2018 | Stöger .................. H02M 3/156 |

FOREIGN PATENT DOCUMENTS

| | | |
|---|---|---|
| CN | 105322793 A | 2/2016 |
| DE | 102015206243 A1 | 10/2016 |
| JP | H0564425 A | 3/1993 |
| JP | 2008101590 A | 5/2008 |
| JP | 2009240025 A | 10/2009 |
| JP | 2009240112 A | 10/2009 |
| JP | 2011040218 A | 2/2011 |
| JP | 2012059839 A | 3/2012 |

OTHER PUBLICATIONS

International Search Report and Written Opinion for PCT/US2018/029228, dated Aug. 10, 2018.

Yu, Wensong; Lai, Jih-Sheng. "Ultra High Efficiency Bidirectional DC-DC Converter With Multi-Frequency Pulse Width Modulation," IEEE, Copyright 2008.

Search Report dated Jul. 23, 2020, from corresponding application No. CN 201880029581.8.

* cited by examiner

HYSTERESIS-CONTROLLED DC-DC BOOST CONVERTER FOR AERIAL VEHICLES

CROSS-REFERENCE TO RELATED APPLICATIONS

This application claims priority to U.S. patent application Ser. No. 15/717,087, filed Sep. 27, 2017, which claims priority to U.S. Patent Application No. 62/501,701, filed May 4, 2017. The contents of each of these applications are incorporated by reference herein in their entirety.

BACKGROUND

Today, unmanned aerial vehicles (or "UAVs") are used increasingly frequently in an ever-growing number of applications, including but not limited to surveillance, law enforcement, military, safety, crop management, inspection or delivery operations. A modern unmanned aerial vehicle is typically an integrated system that includes a number of propellers, motors, communication equipment, imaging devices, power sources and various other components or machines, and may, in some embodiments, be configured to retrieve, transport or deposit payloads of various sizes. Characterized by their comparatively small sizes and high maneuverability, unmanned aerial vehicles may often perform tasks at lower costs and with lower levels of risk to humans than other powered vehicles, e.g., manned aerial vehicles.

Unmanned aerial vehicles include electrical circuits for powering the various propulsion motors, control surfaces, control systems, payload engagement systems and other electrical loads that are provided thereon. Typically, an unmanned aerial vehicle includes a power source, such as a direct current (DC) battery, that provides power to the onboard electrical loads via pairs of positive and negative leads. Such power sources are typically constructed to provide power at or near a nominal voltage level, and may be recharged, for example, by removing the power sources from the unmanned aerial vehicle and connecting charging leads thereto, or by recharging the power sources in place within the unmanned aerial vehicle.

An output voltage of a battery is a function of the state of its charge. As a battery discharges power, the output voltage of the battery naturally falls over time. Where a battery is provided as a power source for one or more propulsion motors of an unmanned aerial vehicle, a reduction in the output voltage of the battery necessarily reduces the amount of thrust that may be generated by the unmanned aerial vehicle. Moreover, many electrical loads aboard an unmanned aerial vehicle, such as propulsion motors, are subject to surges in starting current or other factors which may cause voltage levels aboard the unmanned aerial vehicle to fluctuate to undesirable degrees.

DETAILED DESCRIPTION

As is set forth in greater detail below, the present disclosure is directed to systems and methods for boosting direct current (DC) voltage levels. More specifically, the present disclosure is directed to power conversion units that are configured for boosting direct current (DC) voltage levels in response to changes in demand. In some embodiments, the power conversion units may be releasably mounted within aerial vehicles or other systems for which increased DC voltage levels are desired. The power conversion units may include any number of power modules having any shape or size that may be releasably mounted within a housing or other like structure of a power conversion unit, and may be activated or deactivated in response to changes in demand. The power conversion units thus provide low-weight, fault-tolerant systems for providing power at desired voltage levels and current levels for powering loads aboard unmanned aerial vehicles ("UAV"), or drones. Additionally, the power modules may operate using analog components, rather than digital or software-driven components, thereby reducing the risk that such modules may be subject to one or more software-related faults and/or hacking. In some embodiments, the power modules may be releasably mounted within the power conversion units.

Figure 1A:
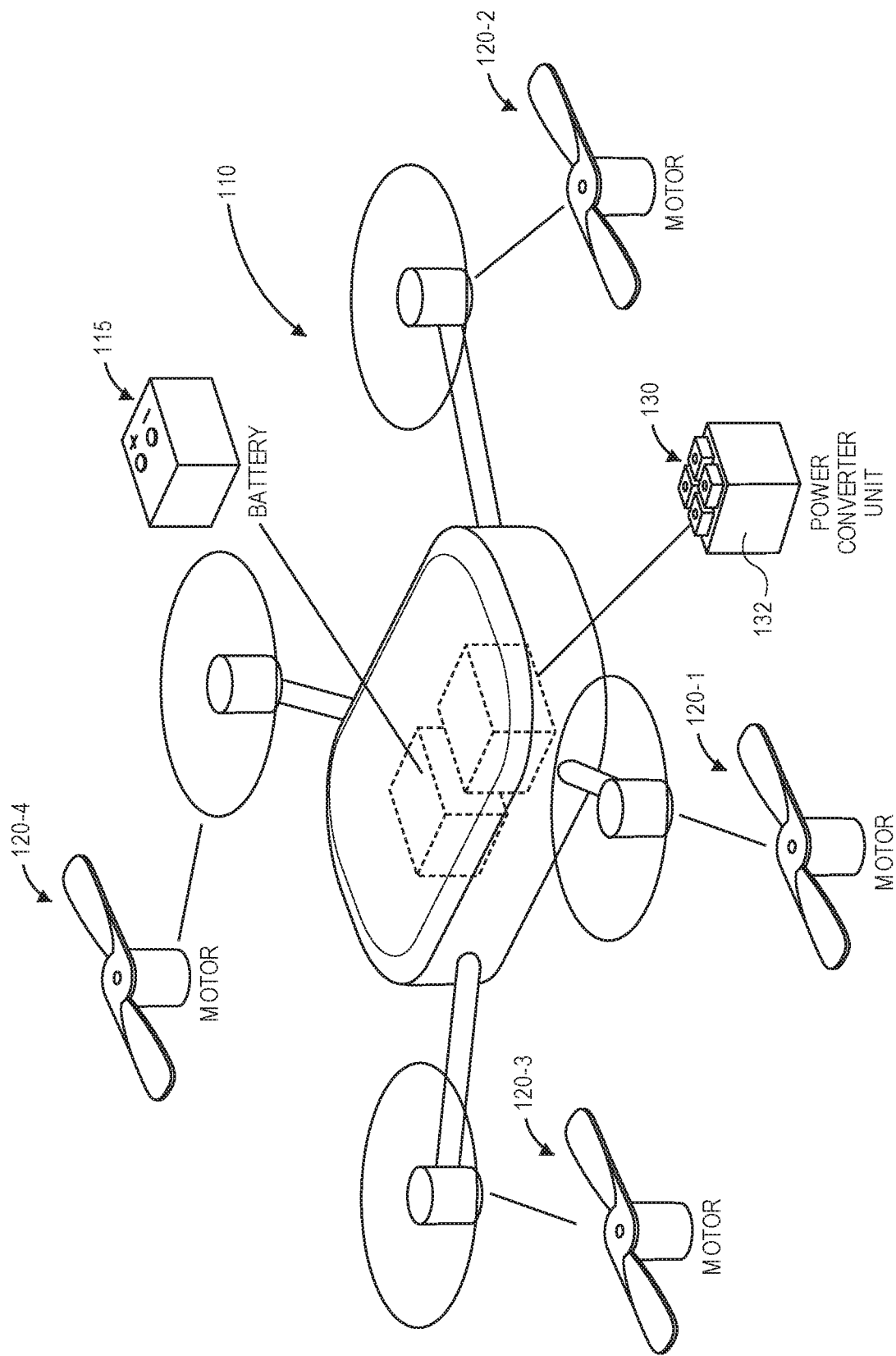
FIGS. 1A and 1B are views of aspects of one aerial vehicle having a power conversion unit in accordance with embodiments of the present disclosure.
Figure 1B:
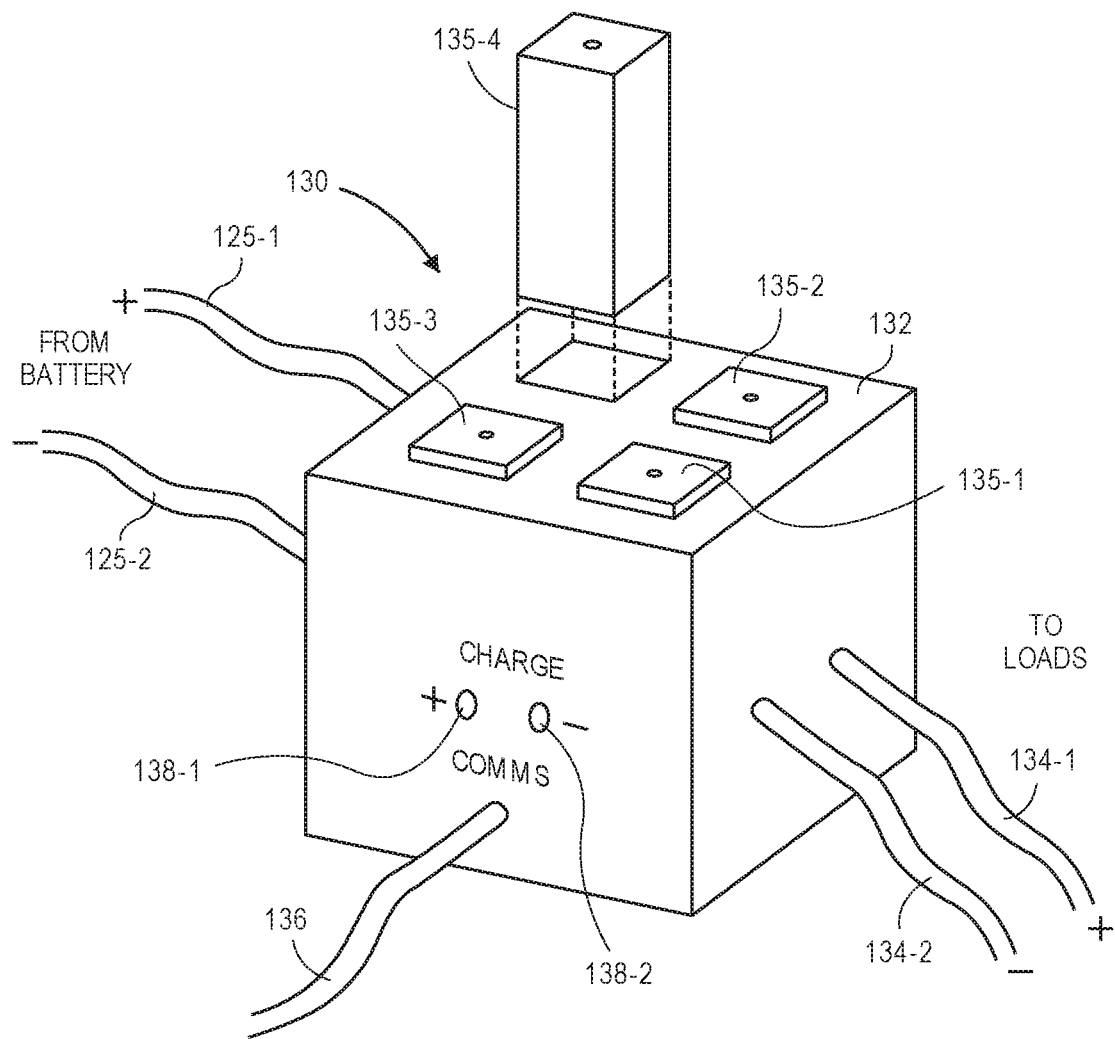

Referring to FIGS. 1A and 1B, views of aspects of one aerial vehicle 110 having a power conversion unit in accordance with embodiments of the present disclosure are shown. As is shown in FIG. 1A, the aerial vehicle 110 includes a battery 115 (or another power supply), a plurality of motors 120-1, 120-2, 120-3, 120-4 and a power conversion unit 130.

In some embodiments, the battery 115 may be a lithium ion battery or, alternatively, any other type of battery or other power cell, e.g., dry cell or wet cell batteries such as lead-acid batteries, nickel cadmium batteries or nickel metal hydride batteries, or any other type, size or form of batteries. The battery 115 may be a single battery or, alternatively, a plurality of batteries or other power cell (e.g., a power pack comprising two or more batteries). In some embodiments, the battery 115 may have a nominal voltage level of forty-five to sixty volts (45 V to 60 V). In other embodiments, the battery 115 may have a nominal voltage level of twelve volts (12 V), twenty-four volts (24 V), thirty-six volts (36 V), forty-eight volts (48 V), or any other voltage level. Alternatively or additionally, the aerial vehicle 110 may include any other type or form of power source.

In some embodiments, the motors 120-1, 120-2, 120-3, 120-4 may be any type or form of motor or other prime mover for causing one or more propellers to rotate at a selected speed or angular velocity. For example, one or more of the motors 120-1, 120-2, 120-3, 120-4 may be a brushless DC motor such as an outrunner brushless motor or an inrunner brushless motor. Alternatively, one or more of the motors 120-1, 120-2, 120-3, 120-4 may be a shunt motor, a separately excited motor, a permanent magnet motor, a reluctance motor, a hysteresis motor, an induction motor or a synchronous motor.

The power conversion unit 130 shown in FIG. 1A is connected in series between the battery 115 and each of the motors 120-1, 120-2, 120-3, 120-4. The power conversion unit 130 is shown as having a housing 132 that may be releasably installed within or mounted to a frame of the aerial vehicle 110.

As is shown in FIG. 1B, the power conversion unit 130 includes a plurality of power modules 135-1, 135-2, 135-3, 135-4 releasably inserted within the housing or other structure. The power conversion unit 130 also includes a positive lead 125-1 and a negative lead 125-2 connected to the battery 115. The power conversion unit 130 further includes a positive lead 134-1 and a negative lead 134-2 for providing power to the motors 120-1, 120-2, 120-3, 120-4 and/or to one or more speed control systems or modules, or any other electrical loads provided aboard the aerial vehicle 110. The power conversion unit 130 also includes a connection 136 to one or more communications and/or control systems, and a positive charging lead 138-1 and a negative charging lead 138-2 for charging the battery 115 by way of the power conversion unit 130. The positive lead 134-1, the negative lead 134-2, the connection 136, the positive charging lead 138-1 and the negative charging lead 138-2 may be any plugs, jacks or other mating components that are configured to connect with any electrical or communications systems operating aboard the aerial vehicle 110 in any manner, e.g., by way of quick connect/disconnect terminals.

As is further shown in FIG. 1B, the power modules 135-1, 135-2, 135-3, 135-4 are releasably inserted within the housing or other structure of the power conversion unit 130, such that one or more of the power modules 135-1, 135-2, 135-3, 135-4 may be replaced without affecting the operation of the power conversion unit 130. For example, the power modules 135-1, 135-2, 135-3, 135-4 may be manually or automatically removed from the housing 132, and a compatible replacement power module may be inserted into the housing 132, after either or both of the aerial vehicle 110 or the power conversion unit 130 have been shut down or, alternatively, while the aerial vehicle 110 and/or the power conversion unit 130 remain operating.

Each of the power modules 135-1, 135-2, 135-3, 135-4 includes one or more components for receiving electrical power at one voltage level and/or current level, and discharging electrical power at one or more other voltage levels and/or current levels, as well as one or more isolation switches (e.g., high-side switches) and/or voltage regulators. For example, each of the power modules 135-1, 135-2, 135-3, 135-4 may include circuits having one or more inductors, transistors, capacitors, amplifiers, gates, resistors and/or other components that may be required to provide power to the motors 120-1, 120-2, 120-3, 120-4 and other electrical loads aboard the aerial vehicle 110. In some embodiments, the power conversion unit 130 may be configured to generate electrical power at a voltage level that is greater than a voltage level of the battery 115. For example, with one or more of the power modules 135-1, 135-2, 135-3, 135-4 operating, the power conversion unit 130 may be configured to distribute electrical power at a voltage level of approximately one hundred fifty volts (150 V), or at any other voltage level, to the motors 120-1, 120-2, 120-3, 120-4 or any other electrical loads operating on the aerial vehicle 110.

In some embodiments, the operation of the respective power modules 135-1, 135-2, 135-3, 135-4 may be triggered by one or more computer processors which operate in a supervisory role, and may select one or more of the respective power modules 135-1, 135-2, 135-3, 135-4 in response to sensed or anticipated changes in electrical loading or demand. For example, such processors may initiate the operation of one or more of the modules either concurrent with or following the operation of one or more of the motors 120-1, 120-2, 120-3, 120-4, e.g., when increased currents to such motors are sensed, or prior to the anticipated starting of one or more of the motors 120-1, 120-2, 120-3, 120-4. Likewise, such processors may shut down one or more of the power modules 135-1, 135-2, 135-3, 135-4 when such power modules 135-1, 135-2, 135-3, 135-4 are not required to satisfy existing electrical loads.

The power conversion unit 130 and the power modules 135-1, 135-2, 135-3, 135-4 may have any size, and may take any shape or form. For example, as is shown in FIGS. 1A and 1B, the power conversion unit 130 includes a housing 132 having a substantially square cross-section, and each of the power modules 135-1, 135-2, 135-3, 135-4 has a rectangular canister-like construction, e.g., with a substantially square cross-section including any number of electrical circuit components therein. For example, each of the power modules 135-1, 135-2, 135-3, 135-4 may include one or more printed circuit boards or cards having one or more inductors, capacitors, amplifiers, transistors, switches, comparators or any other components soldered, embedded or otherwise joined thereto, along with conductors extending therebetween. In some embodiments, the printed circuit boards or cards may be formed in a single layer or from multiple layers, and may have a substrate with components and/or layers laminated or otherwise joined thereto.

In some embodiments, one or more of the power modules 135-1, 135-2, 135-3, 135-4 may have a first dimension (e.g., a width, a depth or a diameter) of approximately two inches and a second dimension (e.g., a height) of approximately six inches. Alternatively, the power conversion units and/or the power modules of the present disclosure may have any other shapes and/or cross-sections. The dimensions of the power conversion unit 130 and/or the respective power modules 135-1, 135-2, 135-3, 135-4 may also be selected to accommodate any of the components therein. Moreover, the power modules 135-1, 135-2, 135-3, 135-4 may be releasably maintained within the housing of the power conversion unit 130 by one or more latches, fasteners (e.g., screws or the like), or other components.

Additionally, although the power conversion unit 130 shown in FIGS. 1A and 1B includes four power modules 135-1, 135-2, 135-3, 135-4, power conversion units of the present disclosure may have any number of power modules, including but not limited to two, three, five, six, seven, eight or more power modules. In some embodiments, a number of power modules may be selected in order to achieve (n+1) tolerance, such that the power conversion unit 130 may operate in all desired or anticipated modes even if one of the power modules 135-1, 135-2, 135-3, 135-4 is subject to failure. Moreover, in some embodiments, the power modules 135-1, 135-2, 135-3, 135-4 may be homogenous in nature, such that each of the power modules 135-1, 135-2, 135-3, 135-4 may have the same capacities, or the same number, type, size and rating of internal components, and may be configured to provide electrical power at the same voltage levels and current levels. Alternatively, in other embodiments, the power modules 135-1, 135-2, 135-3, 135-4 may be heterogeneous in nature, such that one or more of the power modules 135-1, 135-2, 135-3, 135-4 may have different capacities, or different numbers, types, sizes or ratings of internal components, or be configured to provide electrical power at different voltage levels or current levels. Additionally, although the aerial vehicle 110 shown in FIG. 1A is equipped with a single power conversion unit 130, an aerial vehicle, such as the aerial vehicle 110, may be outfitted with two or more power conversion units in accordance with the present disclosure, each having two or more of the power modules disclosed herein.

Therefore, in accordance with the present disclosure, unmanned aerial vehicles or other powered systems may be outfitted with power conversion units having two or more independently controlled and operated power modules for providing electrical power to loads, such as propulsion motors, at desired voltage levels and current levels in response to demand. Moreover, the power conversion units of the present disclosure enable power sources (e.g., batteries) and electrical loads (e.g., propulsion motors) to be decoupled from one another and optimized independently with respect to one another. Each of the power modules may be independently operated within an electrical circuit, or isolated from an electrical circuit, e.g., by one or more isolation switches, that may be normally closed but opened in the event of a fault (e.g., overcurrent). Moreover, the power modules may further include power stages formed from hardware components such as inductors, transistors (e.g., metal-oxide semiconductor field effect transistors, or MOSFETs), amplifiers (e.g., operational amplifiers), capacitors and/or resistors, or like components, thereby reducing one or more risks of failure associated with software components. For example, because the power modules are configured for individual operation without the use of software, no single software failure may adversely affect each of the power modules simultaneously.

Each of the power modules may be operated subject to hysteresis control. For example, the output voltages that are provided to propulsion motors or other electrical loads by the one or more power modules may be boosted or stepped up with respect to their input voltages by alternatively increasing and decreasing current flows through a boost inductor, which causes magnetic fields to increase and decrease in strength. The increasing and decreasing current flows through the boost inductor are controlled by the alternating operation of switches downstream of the boost inductor. The switches may be MOSFETs or any other form of transistor or other switching equipment, which may operate based on gate voltages supplied by a gate driver that is controlled by hysteresis. For example, an error amplifier may determine a difference between a reference voltage that corresponds to a desired voltage to be generated by a power stage (e.g., based on load demanded from the power stage), and an output voltage actually being generated by the power stage. The error amplifier may then generate a voltage signal based on the difference that corresponds to a reference current for generating the desired voltage. A hysteresis controller may receive the voltage signal corresponding to the reference current, and compare that voltage signal to a voltage signal proportional to the current flow passing through the boost inductor. If the current flow passing through the boost inductor is less than the reference current, the hysteresis controller will cause the gate driver to operate the switches less frequently, thereby increasing the current flow through the boost inductor, and enabling magnetic fields of increasing strength to be generated accordingly, until the output voltages generated by the power stage equal the reference voltage. If the current flow passing through the boost inductor is greater than the reference current, the hysteresis controller will cause the gate driver to operate the switches more frequently, thereby reducing the current flow through the boost inductor, and reducing the strength of the magnetic fields generated thereby until the output voltages generated by the power stage equal the reference voltage. The hysteresis controller may take the form of one or more amplifiers, comparators, or any other components that are configured to determine differences between reference currents and currents flowing through a boost inductor, and to control the operation of switches at frequencies selected based on such differences accordingly.

The power modules may be configured for zero voltage switching, or "ZVS." For example, the power modules may be configured to operate switches when current flowing through a boost inductor reaches a desired current level (e.g., defined by the reference current provided by an error amplifier to a hysteresis controller), and again when the current flowing through the boost inductor reaches a negative value, e.g., an amount of current flow through the boost inductor in a reverse direction, namely, a zero voltage switching current. The magnitude of the zero voltage switching current can be tuned to form a resonance between the boost inductor and one or more capacitors in the circuit, such that the voltage across a switch is zero when the switch turns on, thereby eliminating the majority of power loss due to switching, and increasing the efficiency of the power module.

The power modules may be further configured for bi-directional operation. For example, in some implementations, power that is provided at a first voltage level at an output connection of a power module may be stepped down to a second voltage level and provided at an input connection of the power module by the same components that may step up an input voltage to an output voltage, as described in connection with one or more of the embodiments disclosed herein. In some embodiments, a hysteresis controller may include one or more components (e.g., comparators, amplifiers or others) for comparing a current flow through a boost inductor to different values of a reference current, such as a positive value of the reference current and a negative value of the reference current, in order to support this bi-directional operation.

Additionally, in some embodiments, a hysteresis controller of a power stage may include one or more components for comparing a value of a current flow through a boost inductor to both a reference current corresponding to a desired voltage to be generated by the power stage and also a zero voltage switching current level, to thereby ensure that the current through the boost inductor is always sufficient to operate the switches with zero voltage switching.

The power modules may also be configured to shut down in the event of an overcurrent condition or any other adverse event, e.g., by halting the switching of the one or more pairs of transistors and/or opening one or more of the isolation switches, as necessary.

Figure 2:
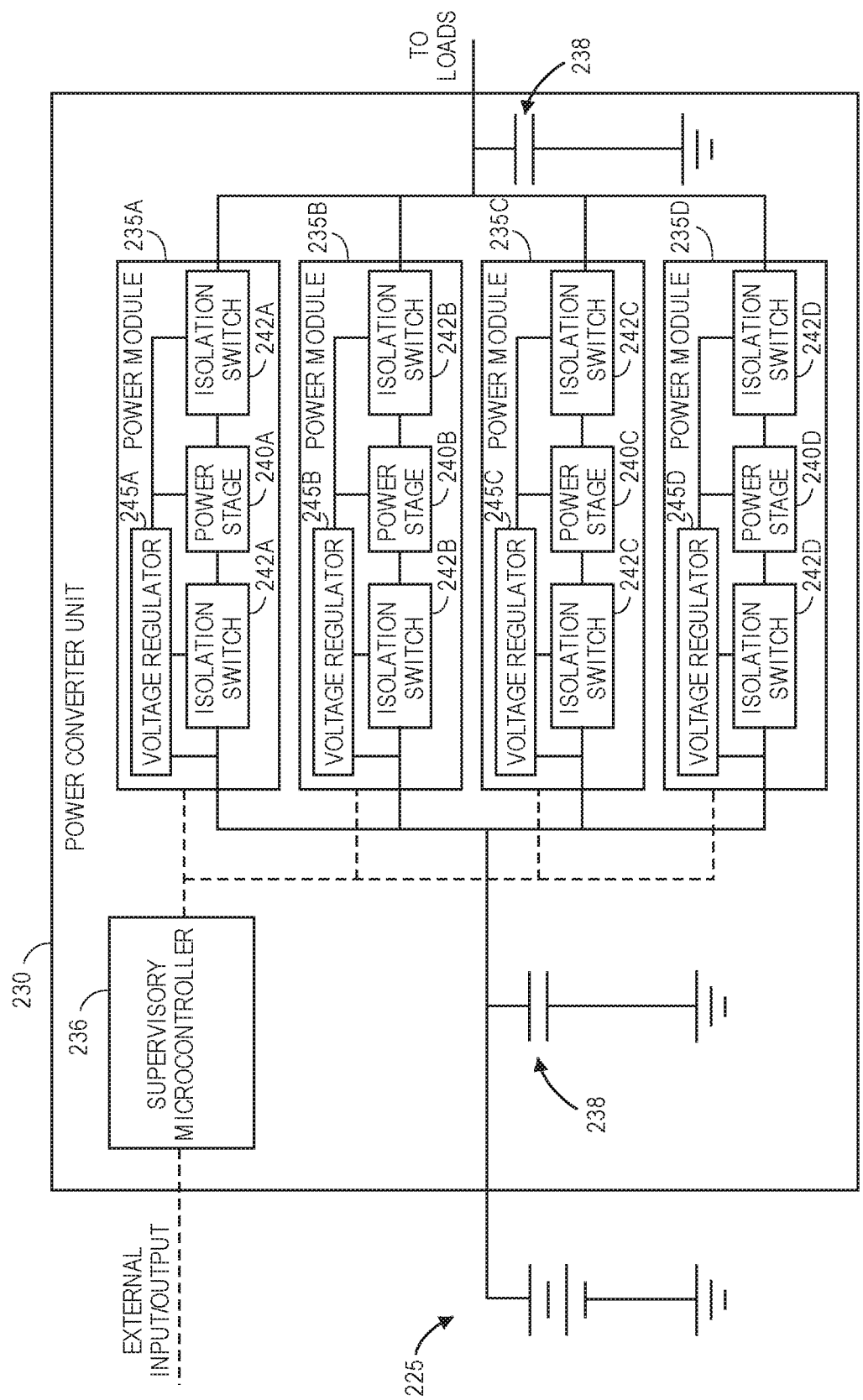
FIG. 2 is a block diagram of one power conversion unit in accordance with embodiments of the present disclosure.

Referring to FIG. 2, a block diagram of one power conversion unit 230 in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in FIGS. 1A and 1B.

As is shown in FIG. 2, the power conversion unit 230 is configured to receive power from a power source 225 (e.g., a battery) and includes a plurality of power modules 235A, 235B, 235C, 235D provided in combination with one another between the power source 225 and one or more electrical loads. As is noted above, the power source 225 may be a lithium ion battery or, alternatively, any other type of battery or other power cell, e.g., dry cell or wet cell batteries such as lead-acid batteries, nickel cadmium batteries or nickel metal hydride batteries, or any other type, size or form of batteries. In some embodiments, the power source 225 may have a nominal voltage level of forty-five to sixty volts (45 V to 60 V). In other embodiments, the power source 225 may have a nominal voltage level of twelve volts (12 V), twenty-four volts (24 V), thirty-six volts (36 V), forty-eight volts (48 V), or any other voltage level. Alternatively or additionally, the power source 225 may have any other nominal voltage level.

The power conversion unit 230 further includes a supervisory controller 236 and a pair of filtering capacitors 238 provided upstream and downstream, respectively, of the power modules 235A, 235B, 235C, 235D. Each of the power modules 235A, 235B, 235C, 235D includes a power stage 240A, 240B, 240C, 240D, isolation switches (e.g., high-side switches) 242A, 242B, 242C, 242D provided upstream and downstream of the power stages 240A, 240B, 240C, 240D, and a voltage regulator 245A, 245B, 245C, 245D.

Where the power conversion unit 230 is provided in an aerial vehicle (e.g., an unmanned aerial vehicle, or drone), the supervisory controller 236 may select one or more of the power modules 235A, 235B, 235C, 235D, as necessary, for operation in order to meet the demand for power by the one or more electrical loads. The selections of the power modules 235A, 235B, 235C, 235D may be made on any basis, including but not limited to the voltage and/or current levels required by the electrical loads, capacities of the respective power modules 235A, 235B, 235C, 235D, prior run times of the respective power modules 235A, 235B, 235C, 235D, or any other criterion. The supervisory controller 236 may include one or more computer processors or microprocessors, and any number of inputs and/or outputs. The supervisory controller 236 may be in communication with any number of components to receive or transmit information regarding the status of one or more aspects of the aerial vehicle. For example, the supervisory controller 236 may receive inputs regarding a velocity, an altitude, a course, an airspeed, a voltage level of a power source, or any other information or data regarding the operation of the aerial vehicle, and may select one or more of the power modules 235A, 235B, 235C, 235D for operation accordingly. Alternatively, the supervisory controller 236 may receive inputs regarding the operation of the respective power modules 235A, 235B, 235C, 235D and/or loads with which the power modules 235A, 235B, 235C, 235D are associated, and may report information or data regarding the status of the power modules 235A, 235B, 235C, 235D to one or more onboard or remote locations accordingly.

The filtering capacitors 238 act as local, high-frequency energy sources for the power stages 240A, 240B, 240C, 240D, and also to smooth the power that is ultimately provided to the loads by one or more of the power stages 240A, 240B, 240C, 240D during operation. In some embodiments, each of the filtering capacitors 238 have the same rating (e.g., capacitance). In some embodiments, the filtering capacitors 238 may have different ratings. For example, in some embodiments, the filtering capacitor 238 provided between the power source 225 and the power modules 235A, 235B, 235C, 235D may have a capacitance of one hundred to two hundred microfarads (100 µF to 200 µF). In some embodiments, the filtering capacitor provided between the power modules 235A, 235B, 235C, 235D and the loads may have a capacitance of fifty to one hundred microfarads (50 µF to 100 µF).

The power stages 240A, 240B, 240C, 240D may include any components (e.g., inductors, transistors, capacitors, amplifiers, gates, resistors and/or other components) for receiving electrical power at a predetermined voltage level and providing electrical power at another voltage level (e.g., a higher voltage level) to one or more electrical loads. For example, the power stages 240A, 240B, 240C, 240D may include one or more inductors and capacitors, along with one or more pairs of transistors, for controlling the flow of current to the one or more electrical loads.

In some embodiments, the power stages 240A, 240B, 240C, 240D may include analog components exclusively. In some other embodiments, the power stages 240A, 240B, 240C, 240D may include both analog and digital components, or digital components exclusively.

The isolation switches 242A, 242B, 242C, 242D may be configured to provide power to the one or more loads when the isolation switches 242A, 242B, 242C, 242D are closed, or to manually or automatically isolate the respective power stages 240A, 240B, 240C, 240D from the power source 225 and the loads when the isolation switches 242A, 242B, 242C, 242D are open. In some embodiments, one or more of the isolation switches 242A, 242B, 242C, 242D may be high-side switches having one or more pass elements, gate control blocks or input logic blocks. The voltage regulators 245A, 245B, 245C, 245D are configured to provide low-voltage power to the isolation switches 242A, 242B, 242C, 242D and the power stages 240A, 240B, 240C, 240D during operation.

Figure 3:
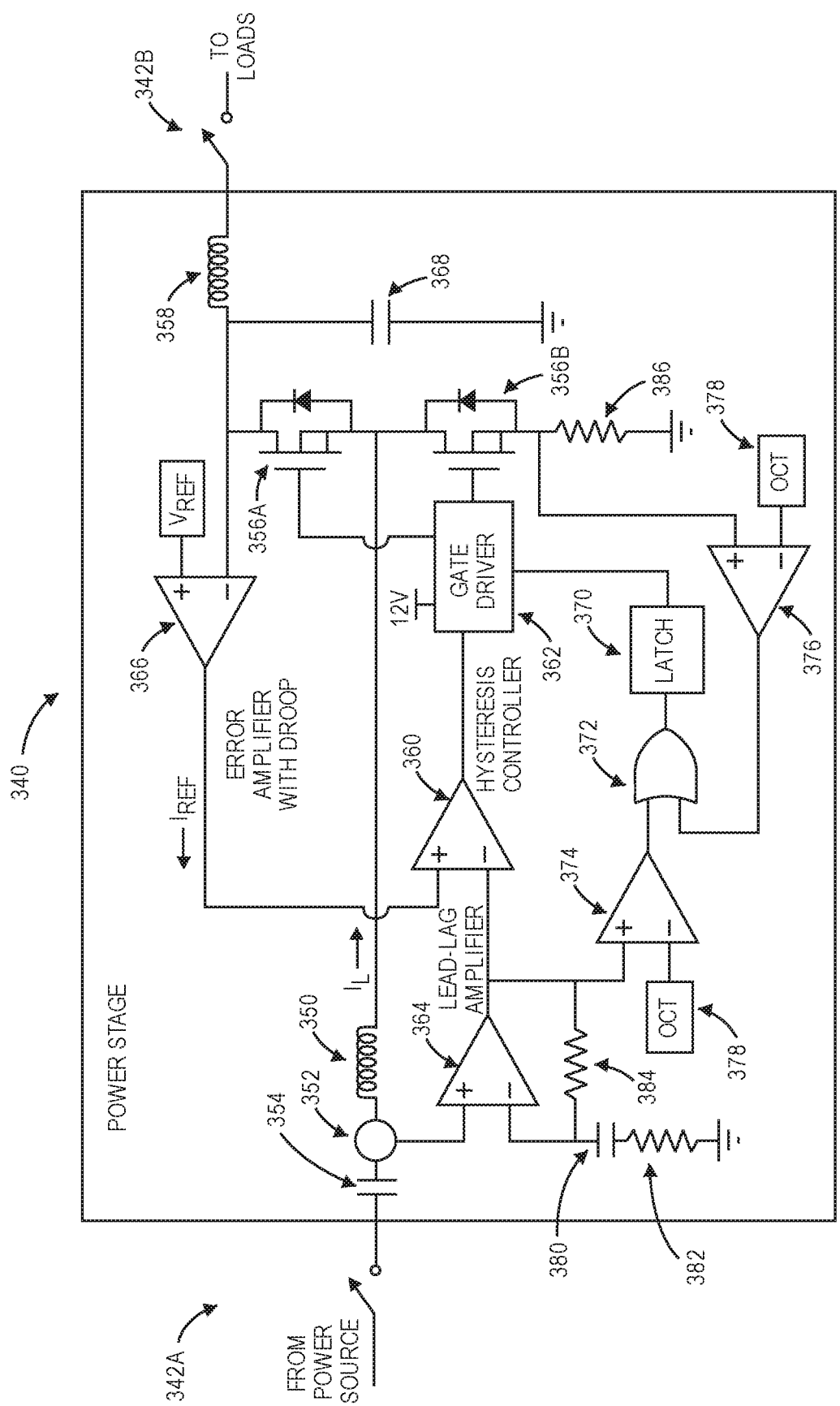
FIG. 3 is a schematic of one power stage that may be provided in a power conversion unit in accordance with embodiments of the present disclosure.

As is discussed above, power modules of the present disclosure may feature power stages that are configured to automatically elevate voltage levels and/or current levels in order to provide electrical power in response to demands. Referring to FIG. 3, a schematic of one power stage 340 that may be provided in a power conversion unit in accordance with embodiments of the present disclosure is shown. Except where otherwise noted, reference numerals preceded by the number "3" shown in the schematic of FIG. 3 indicate components or features that are similar to components or features having reference numerals preceded by the number "2" shown in FIG. 2, by the number "1" shown in FIGS. 1A and 1B.

The power stage 340 includes a boost inductor 350, a current sensor 352, a filtering capacitor 354, a pair of transistors 356A, 356B and an inductor 358. In some embodiments, the current sensor 352 may be a Hall effect current sensor. In some embodiments, the transistors 356A, 356B may be MOSFETs, e.g., either n-channel MOSFETs or p-channel MOSFETs. The power stage 340 further includes a hysteresis controller 360, a gate driver 362, a lead-lag amplifier (e.g., a phase-lag compensator) 364, an error amplifier 366 and an output capacitor 368. The power stage 340 also includes a latch 370 (e.g., a flip-flop, or other bistable multivibrator) operated by a logic gate 372 (e.g., an OR gate) having a pair of inputs from overcurrent comparators 374, 376. The overcurrent comparator 374 includes differential inputs from an output of the lead-lag amplifier 364 and an overcurrent trip setpoint 378, while the overcurrent comparator 376 includes differential inputs from the sense resistor 386 and an overcurrent trip setpoint 378.

As is shown in FIG. 3, the power stage 340 is provided between a pair of isolation switches 342A, 342B and enables current to flow from a power source to one or more electrical loads. In some embodiments, one or both of the isolation switches 342A, 342B may be high-side switches. When the isolation switches 342A, 342B are closed, the power stage 340 is energized by the power source, and a flow of current $I_L$ through the boost inductor 350 to the loads is determined based on the configurations of the transistors 356A, 356B, which may be controlled by a gate driver 362. For example, the gate driver 362 may alternately supply gate voltages to the gates of the respective transistors 356A, 356B, thereby causing the respective transistors 356A, 356B to switch on or off. With the transistor 356A switched off, and the transistor 356B switched on, current flows through the boost inductor 350 and across a resistor 386. The flow of current $I_L$ through the boost inductor 350 causes a magnetic field to build in strength, thereby storing energy therein. In some embodiments, the resistor 386 may have a substantially small resistance, e.g., approximately one milliohm (1 mΩ), thereby ensuring that the flow of current $I_L$ across the boost inductor 350 is sufficiently high.

With the transistor 356A switched on, and the transistor 356B switched off, current $I_L$ flowing through the boost inductor 350 drops off over time, and energy stored in the magnetic field of the boost inductor 350 is discharged through the transistor 356A and to the loads by way of the filtering inductor 358 and the isolation switch 342B. Thus, the switching of the transistors 356A, 356B determines the amount and source of the current flow to the loads. In some embodiments, the boost inductor 350 may have an inductance of one microhenry (1 µH) inductor and may be rated to accommodate a current $I_L$ of approximately one hundred amperes (100 A). In other embodiments, the boost inductor 350 may have any level of inductance that is consistent for use in connection with the power source and/or the one or more loads. Likewise, in some embodiments, the filtering inductor 358 may have an inductance of two microhenrys (2 µH) inductor and may be rated to accommodate a current of approximately twenty to twenty-five amperes (20 A to 25 A). In other embodiments, the filtering inductor 358 may have the same inductance and be configured to accommodate the same current as the boost inductor 350, or may have any level of inductance that is consistent for use in connection with the power source and/or the one or more loads.

The switching of the transistors 356A, 356B is controlled by the hysteresis controller 360. As is shown in FIG. 3, the hysteresis controller 360 receives inputs from the lead-lag amplifier 364 and from the error amplifier 366. The lead-lag amplifier 364 has inputs in the form of signals corresponding to the current $I_L$ sensed by the current sensor 352 and feedback from a capacitor 380 and/or a pair of resistors 382, 384. The input received by the hysteresis controller 360 as an output from the lead-lag amplifier 364 is a voltage signal that is proportional to the current $I_L$ sensed by the current sensor 352, e.g., with the addition of a phase by the lead-lag amplifier 364. The input received from the error amplifier 366 may be a voltage signal that is consistent with a reference current $I_{REF}$ for overcoming a difference between a reference voltage $V_{REF}$ and the actual output voltage of the power stage 340. The reference voltage $V_{REF}$ may correspond to a desired voltage to be generated by the power stage 340 (e.g., based on load demanded from the power stage 340), and an output voltage actually being generated by the power stage 340. In some embodiments, the power stage 340 need not include the lead-lag amplifier 364 and/or the capacitor 380 or either of the resistors 382, 384.

Thus, when the output voltage is less than the reference voltage $V_{REF}$, the reference current $I_{REF}$ will be less than the current $I_L$ passing through the boost inductor 350. Based on the difference between the reference current $I_{REF}$ and the current $I_L$ passing through the boost inductor 350, the hysteresis controller 360 will cause the gate driver 362 to reduce the switching frequency of the transistors 356A, 356B, thereby increasing the energy stored in the boost inductor 350. As the output voltage approaches the reference voltage $V_{REF}$, the reference current $I_{REF}$ will be reduced until the reference current $I_{REF}$ equals the current $I_L$ passing through the boost inductor 350.

When the output voltage is greater than the reference voltage $V_{REF}$, the reference current $I_{REF}$ will be greater than the current $I_L$ passing through the boost inductor 350. Based on the difference between the reference current $I_{REF}$ and the current $I_L$ passing through the boost inductor 350, the hysteresis controller 360 will cause the gate driver 362 to increase the switching frequency of the transistors 356A, 356B, thereby reducing the energy stored in the boost inductor 350. As the output voltage approaches the reference voltage $V_{REF}$, the reference current $I_{REF}$ will increase until the reference current $I_{REF}$ equals the current $I_L$ passing through the boost inductor 350.

As is shown in FIG. 3, the power stage 340 further includes a pair of overcurrent trips 378 provided at overcurrent comparators 374, 376 upstream and downstream of the transistors 356A, 356B and the gate driver 362. Thus, when an overcurrent condition is sensed on either side of the transistors 356A, 356B, e.g., either by the current sensor 352, or at the resistor 386, the logic gate 372 will provide a signal to the latch 370 that causes the gate driver 362 to open both of the transistors 356A, 356B. Alternatively, the latch 370 may also be in communication with one or both of the isolation switches 342A, 342B and may also cause the isolation switches 342A, 342B to open in the event of an overcurrent condition.

Figure 4A:
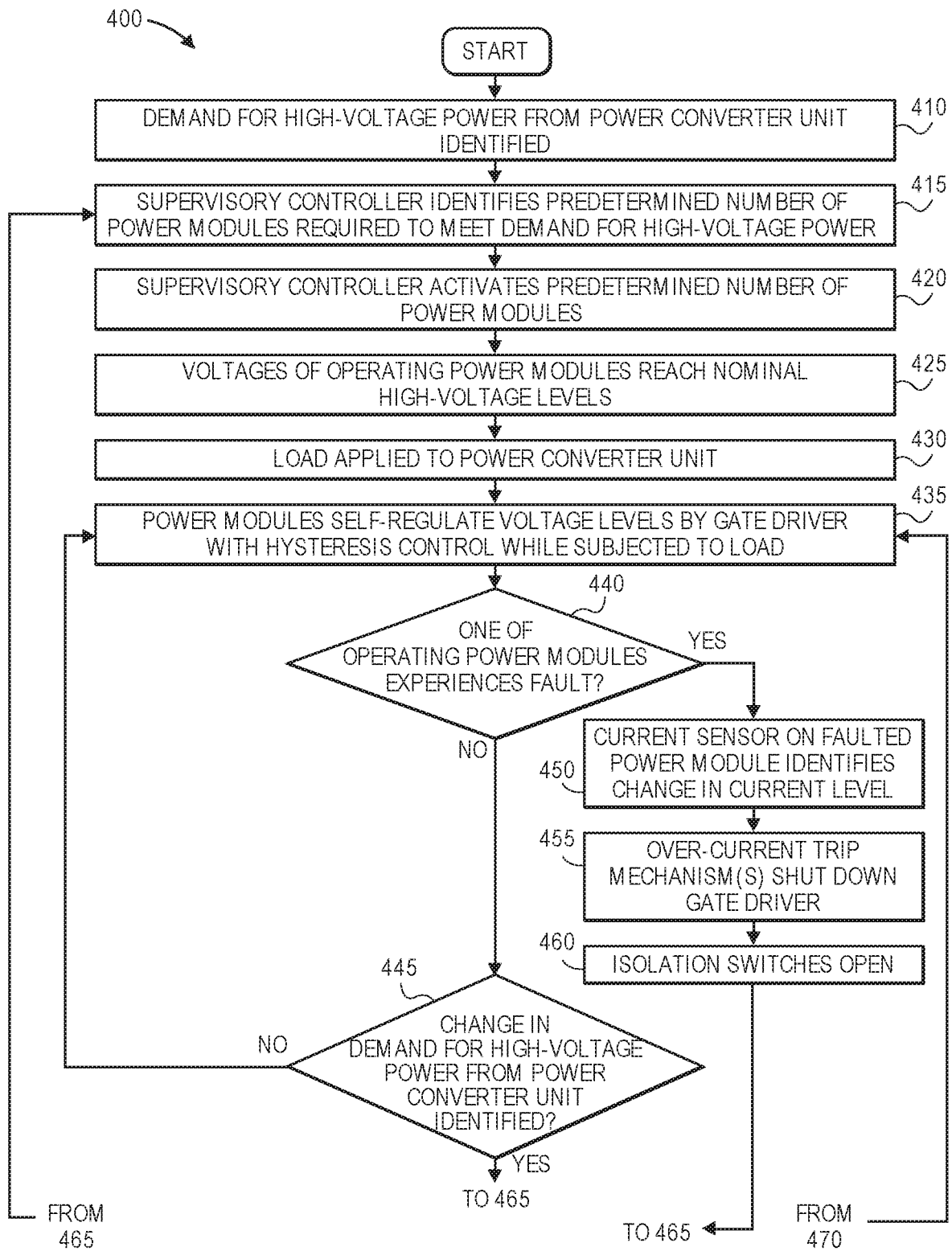
FIGS. 4A and 4B are a flow chart of one process for operating a power conversion unit in accordance with embodiments of the present disclosure.
Figure 4B:
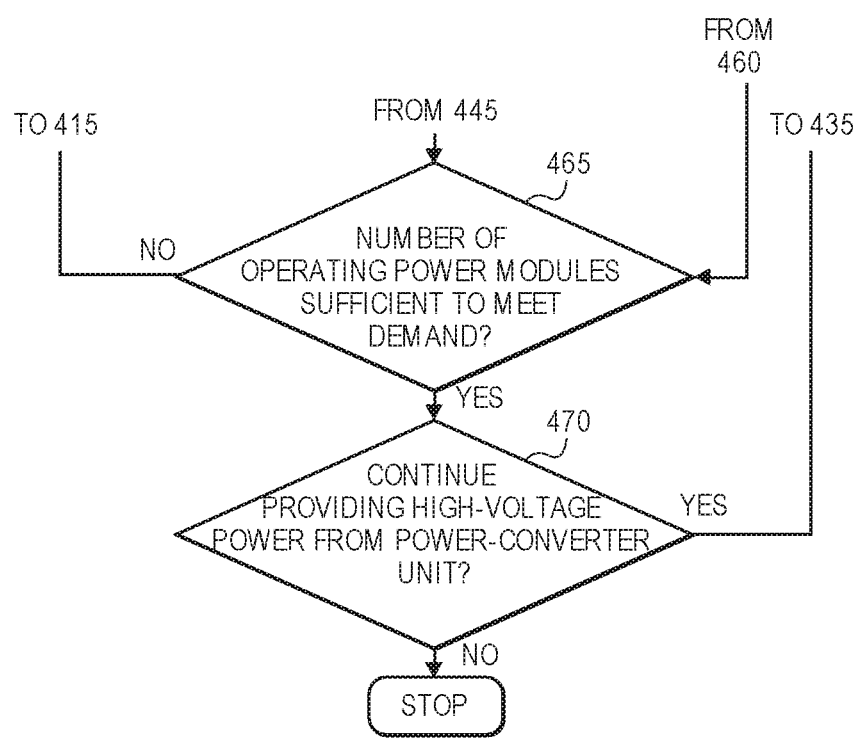

Referring to FIGS. 4A and 4B, a flow chart 400 of one process for operating a power conversion unit in accordance with embodiments of the present disclosure is shown. At box 410, a demand for high-voltage power from a power converter unit is identified. In embodiments in which the power converter unit is provided aboard an unmanned aerial vehicle, the demand may be associated with the operation of a propulsion motor, an item engagement unit, or any other powered component. The demand may be identified during use, or predicted prior to an anticipated use, of the powered component.

At box 415, a supervisory controller of the power converter unit identifies a predetermined number of power modules that are required in order to meet the demand identified at box 410. As is discussed above, the power converter unit may include any number of power modules, which may be homogenous or heterogeneous in nature, and the supervisory controller may select a sufficient number of the power modules to be operated in response to the demand based on any criteria, including but not limited to the voltage and/or current requirements of the demand, the individual capacities of the respective power modules, prior run times of the power modules, or any other factor.

At box 420, the supervisory controller activates the predetermined number of power modules, e.g., by closing high-side switches or other isolation switches associated with power stages of each of the predetermined number of power modules, and at box 425, the voltages of the operating power modules reach their nominal high-voltage levels.

At box 430, a load is applied to the power converter unit, e.g., one or more propulsion motors or other electrical components aboard the aerial vehicle, and at box 435, the power modules self-regulate their respective output voltage levels by a gate driver with hysteresis control while being subject to the load applied at box 430. For example, referring again to the power stage 340 of FIG. 3, the error amplifier 366 may output a voltage signal corresponding to a reference current $I_{REF}$ based on a difference between the reference voltage $V_{REF}$ and the output voltage of the power stage 340. A hysteresis controller 360 may receive the voltage signal corresponding to the reference current $I_{REF}$ and a voltage signal proportional to the current $I_L$ flowing through the boost inductor 350 as inputs, and may output a voltage signal to the gate driver 362 based at least in part on the difference between the reference current $I_{REF}$ and the current $I_L$ flowing through the boost inductor 350. Where the output voltage of the power stage 340 exceeds the reference voltage $V_{REF}$, the voltage signal to the gate driver 362 will increase the rate at which the transistors 356A, 356B switch, thereby reducing the current $I_L$ flowing through the boost inductor 350, and reducing the output voltage of the power stage 340 accordingly. Where the output voltage of the power stage 340 is less than the reference voltage $V_{REF}$, the voltage signal to the gate driver 362 will decrease the rate at which the transistors 356A, 356B switch, thereby increasing the current $I_L$ flowing through the boost inductor 350, and increasing the output voltage of the power stage 340 accordingly.

At box 440, whether any of the operating power modules is experiencing a fault is determined. For example, the fault may be sensed based on a change in speed of a propulsion motor powered by the power conversion unit, a change in an operating temperature associated with the power conversion unit or one or more loads powered by the power conversion unit, or in any other manner. If one of the power modules experiences a fault, then the process advances to box 450, where a current sensor on the faulted power module identifies a change in the current level, and to box 455, where one or more over-current trip mechanisms shuts down the gate driver in response to an over-current condition. Alternatively, the power stage may be equipped with any type or form of other sensing and/or tripping mechanism for identifying overcurrent conditions or other faults. At box 460, isolation switches associated with the faulted power module open, thereby isolating the faulted power module from the power converter unit.

At box 445, after determining that none of the operating power modules is experiencing a fault at box 440, whether a change in the demand for high-voltage power from the power converter unit is identified is determined. For example, where the power converter unit is provided in an operating aerial vehicle, the aerial vehicle may transition from vertical flight operations to forward flight operations, and may no longer require the operation of one or more propulsion motors, thereby resulting in a reduced electrical demand for the aerial vehicle. Alternatively, the aerial vehicle may transition from forward flight operations to vertical flight operations, and may require the operation of one or more additional propulsion motors, thereby resulting in an increased electrical demand for the aerial vehicle. Any change in demand for high-voltage power may be identified on any basis in accordance with the present disclosure.

If no change in the demand for high-voltage power from the power converter is identified, then the process returns to box 435, where the power modules continue to self-regulate their respective voltage levels by their respective gate drivers with hysteresis control while being subjected to the load applied at box 430.

If a change in the demand for high-voltage power from the power control unit is identified at box 445, or after the isolation switches open at box 460, the process advances to box 465, where whether the number of operating power modules is sufficient to meet the existing demand for high-voltage power is determined. If the number of operating power modules is not sufficient to meet the existing demand for high voltage power, then the process returns to box 415, where the supervisory controller identifies a predetermined number of power modules that are required to meet the demand.

If the number of operating power modules is sufficient to meet the existing demand for high-voltage power, then the process advances to box 470, where whether providing high-voltage power from the power converter unit is still desired is determined. If high-voltage power from the power converter unit is still desired, then the process returns to box 435, where the power modules continue to self-regulate their respective voltage levels by their respective gate drivers with hysteresis control while being subjected to the load applied at box 430. If high-voltage power from the power converter unit is no longer desired, then the process ends.

Figure 5:
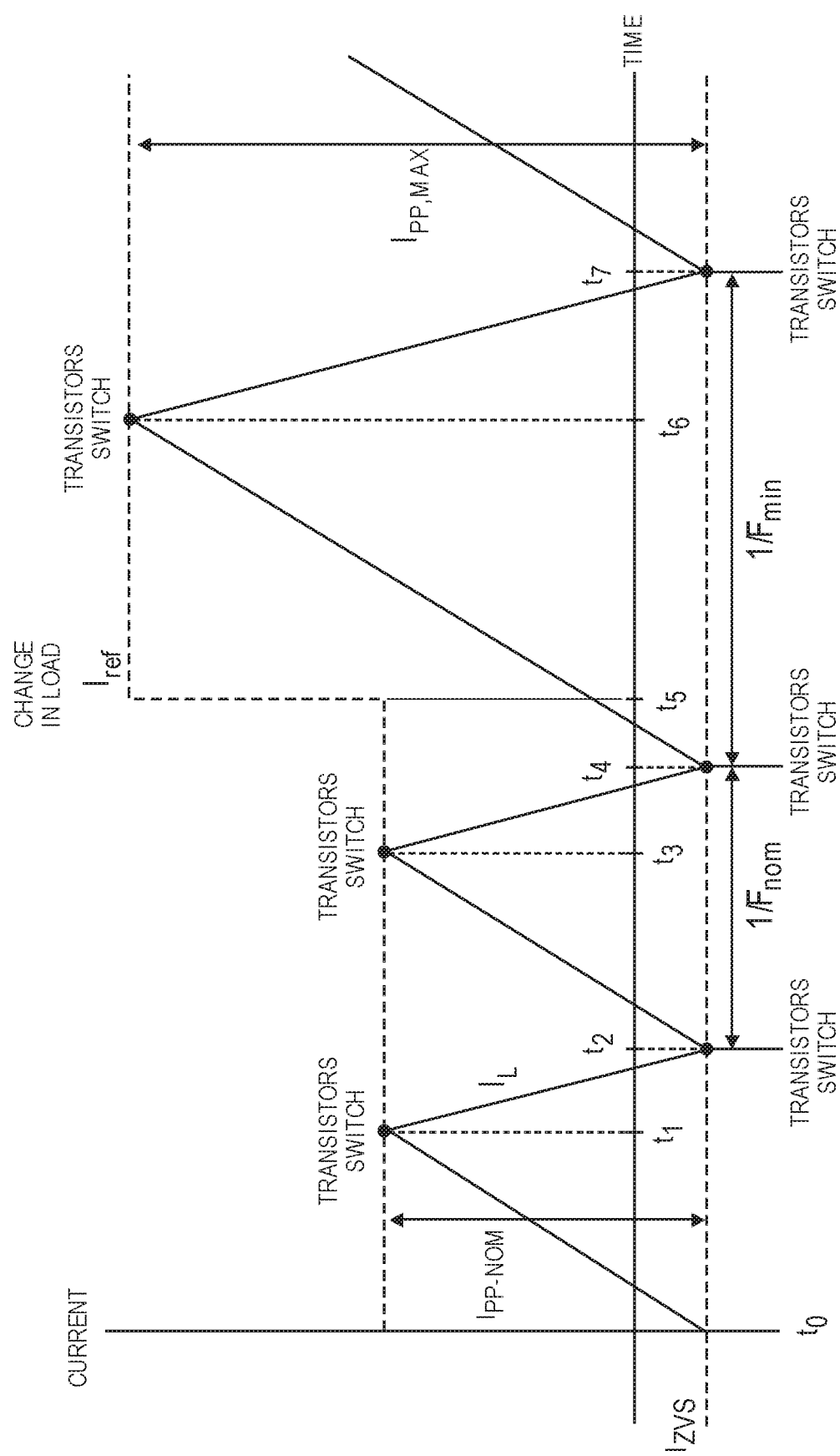
FIG. 5 is a plot of current flow through one power conversion unit in accordance with embodiments of the present disclosure.

Referring to FIG. 5, a plot of current flows through one power conversion unit of the present disclosure is shown. The plot of FIG. 5 shows the flow of current $I_L$ through a boost inductor, e.g., the boost inductor 350 of FIG. 3, of one power module, as the boost inductor is placed under load.

As the boost inductor is energized by a power source, e.g., at time $t_0$, current flowing across the boost inductor and through one of a pair of transistors to one or more loads increases until the current equals a reference current $I_{REF}$, at time $t_1$. Upon sensing that the current $I_L$ flowing through the boost inductor equals the reference current $I_{REF}$, a hysteresis controller, such as the hysteresis controller 360 of FIG. 3, causes a gate driver, such as the gate driver 362 of FIG. 3, to switch the transistor 356B off and to switch the transistor 356A on, and the current $I_L$ across the boost inductor begins to drop. For example, as is shown in FIG. 3, the hysteresis controller 360 receives inputs from the lead-lag amplifier 364, which has as one input a voltage signal proportional to the current $I_L$ flowing through the boost inductor 350 received from the lead-lag amplifier 364, and as another input a voltage signal consistent with a reference current $I_{REF}$ received from the error amplifier 366. The output from the hysteresis controller 360 is fed to the gate driver 362, which causes the transistors 356A, 356B to be energized in an alternating fashion.

As the current $I_L$ across the boost inductor drops, power is provided to the loads via a downstream capacitor, such as the output capacitor 368 of FIG. 3. When the current $I_L$ across the boost inductor reaches a zero-voltage switching current $I_{ZVS}$, the hysteresis controller causes the gate driver to switch the transistors again at time $t_2$, e.g., to switch the transistor 356A of FIG. 3 off and to switch the transistor 356B of FIG. 3 on, thereby permitting the flow of current $I_L$ across the boost inductor to increase again. As the loading on the power conversion unit remains constant, the hysteresis controller will continue to cause the gate driver to switch the transistors, e.g., at times $t_3$ and $t_4$, when the current $I_L$ across the boost inductor reaches the reference current $I_{REF}$ and the zero-voltage switching current $I_{ZVS}$, respectively.

When an increase in electrical loading is observed at time $t_5$, the error amplifier causes the reference current $I_{REF}$ to increase based on the increase in loading. Therefore, the current $I_L$ across the boost inductor is permitted to increase until the current reaches the new reference current $I_{REF}$ at time $t_6$, when the hysteresis controller will cause the transistors to switch again, thereby causing the current $I_L$ across the boost inductor to drop again. At time $t_7$, when the current $I_L$ across the boost inductor has reached the zero-voltage switching current $I_{ZVS}$, the transistors will switch once more, and allow the current $I_L$ across the boost inductor to increase again.

The nominal peak pulse current $I_{PP\text{-}NOM}$ prior to the increase in loading is defined as a difference between the reference current $I_{REF}$ and the zero-voltage switching current $I_{ZVS}$. Thus, with the reference current at the level current $I_{REF}$ shown in FIG. 5 prior to time $t_5$, the difference between the peak times $t_1$ and $t_3$, or between the minimum current times $t_2$ and $t_4$, is defined as a reciprocal of a switching frequency $F_{NOM}$ of the gate driver with respect to the level of loading, or $1/F_{NOM}$. After the increase in loading, the transistors switch at a lower frequency $F_{MIN}$, such that the difference between the minimum current times $t_7$ and $t_4$ is greater than the difference between the minimum current times $t_2$ and $t_4$. The reduced switching frequency results in the more efficient delivery of electrical power, as losses on the boost inductor are proportional to changes in a direction of current flow, viz., switching frequency. The increase in loading also results in a maximum peak pulse current $I_{PP\text{-}MAX}$, which is defined as a difference between the new reference current $I_{REF}$ and the zero-voltage switching current $I_{ZVS}$.

Although the plot of current flow of FIG. 5 shows the effects of an increase in electrical loading on a power module of the present disclosure, those of ordinary skill in the pertinent arts will recognize that the effects of a decrease in electrical loading on the power module would result in a similar plot of current flow with respect to a lower reference current $I_{REF}$.

Figure 6A:
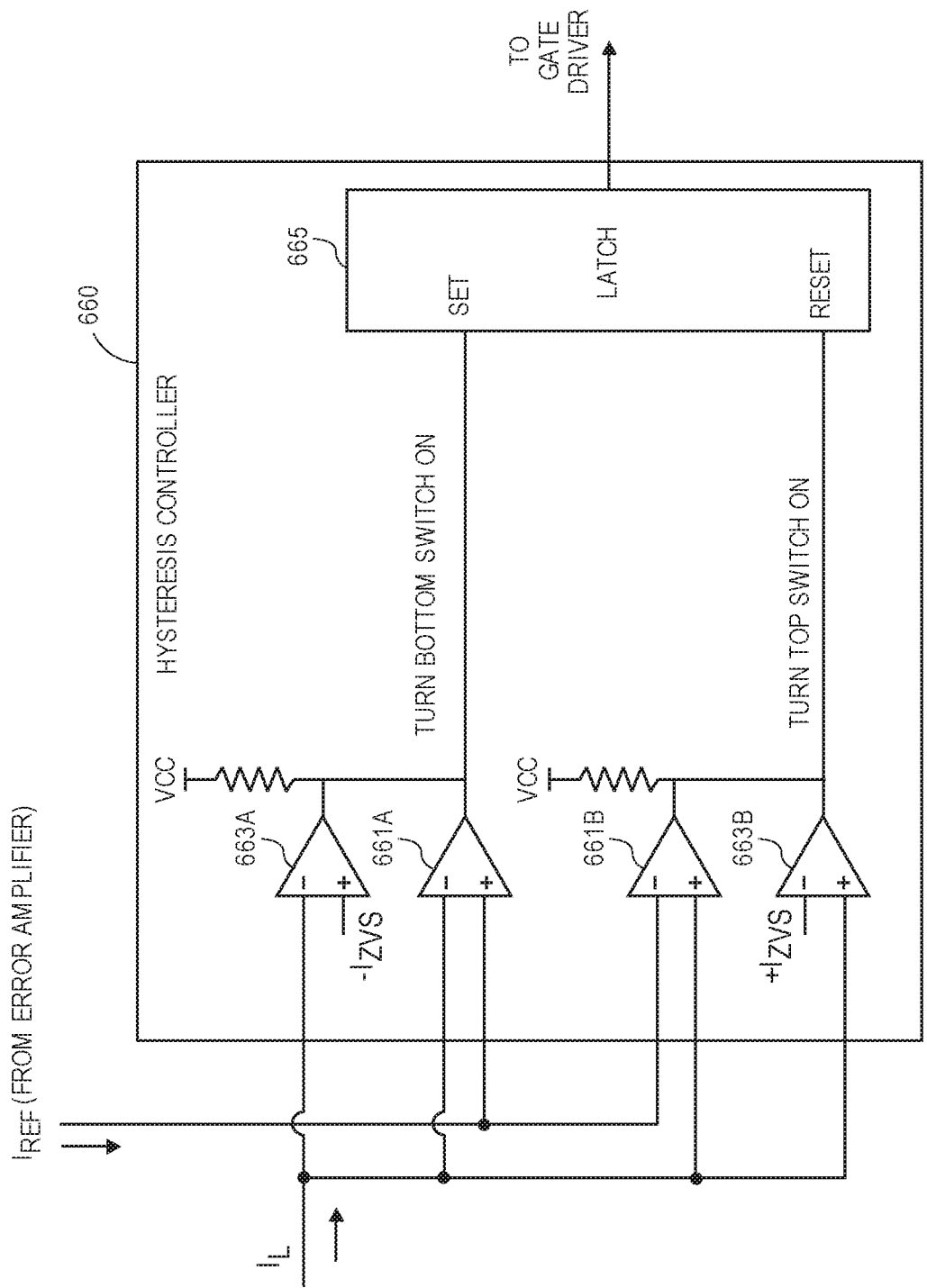
FIG. 6A is a schematic of one hysteresis controller that may be provided in a power stage of a power conversion unit in accordance with embodiments of the present disclosure.

Although the hysteresis controller 360 of FIG. 3 is shown as a single component, e.g., a comparator or an amplifier, the power stages of the present disclosure may include multiple components for determining whether a current flowing through a boost inductor differs from a reference current, and to what extent. Such components may provide for hysteresis-controlled zero voltage switching of current flows, regardless of whether the power stages are configured for providing power in a forward direction or in a reverse direction. Referring to FIG. 6A, a schematic of one hysteresis controller 660 that may be provided in a power stage of a power conversion unit in accordance with embodiments of the present disclosure is shown. Except where otherwise noted, reference numerals preceded by the number "6" shown in FIG. 6A indicate components or features that are similar to components or features having reference numerals preceded by the number "3" shown in FIG. 3, by the number "2" shown in FIG. 2, by the number "1" shown in FIGS. 1A and 1B.

As is shown in FIG. 6A, the hysteresis controller 660 includes four comparators 661A, 661B, 663A, 663B and a latch 665 (e.g., a flip-flop). The comparator 661A includes inputs in the form of a voltage signal corresponding to a reference current $I_{REF}$ and a voltage signal corresponding to a current $I_L$ flowing through a boost inductor, e.g., the boost inductor 350 of FIG. 3. The voltage signal corresponding to the reference current $I_{REF}$ may be generated by an error amplifier, e.g., the error amplifier 366 of FIG. 3, and may correspond to a difference between an output voltage of a power stage and a reference voltage, e.g., a desired output voltage. The comparator 663A includes inputs in the form of a voltage signal corresponding to a negative zero voltage switching current $-I_{ZVS}$ and the voltage signal corresponding to the current $I_L$. Thus, the latch 665 may receive a signal for switching on one transistor, e.g., the transistor 356B of FIG. 3, for causing the boost inductor to store energy in a magnetic field generated thereby, when both the comparator 661A and the comparator 663A indicate that the current $I_L$ passing through the boost inductor is less than both the reference current $I_{REF}$ and the negative zero voltage switching current $-I_{ZVS}$. The latch 665 may then send a corresponding signal to a gate driver, e.g., the gate driver 362 of FIG. 3, for switching on and off the appropriate transistors.

The comparator 661B includes inputs in the form of the voltage signal corresponding to the reference current $I_{REF}$ and the voltage signal corresponding to the current $I_L$, while the comparator 663B includes inputs in the form of a voltage signal corresponding to a positive voltage switching current $+I_{ZVS}$ and the voltage signal corresponding to the current $I_L$. Thus, the latch 665 may receive a signal for switching on one transistor, e.g., the transistor 356A of FIG. 3, for causing the magnetic field generated by the boost inductor to discharge energy therefrom, when both the comparator 661A and the comparator 663A indicate that the current $I_L$ passing through the boost inductor is greater than both the reference current $I_{REF}$ and the positive zero voltage switching current $+I_{ZVS}$. The latch 665 may then send a corresponding signal to a gate driver, e.g., the gate driver 362 of FIG. 3, for switching on and off the appropriate transistors.

Figure 6B:
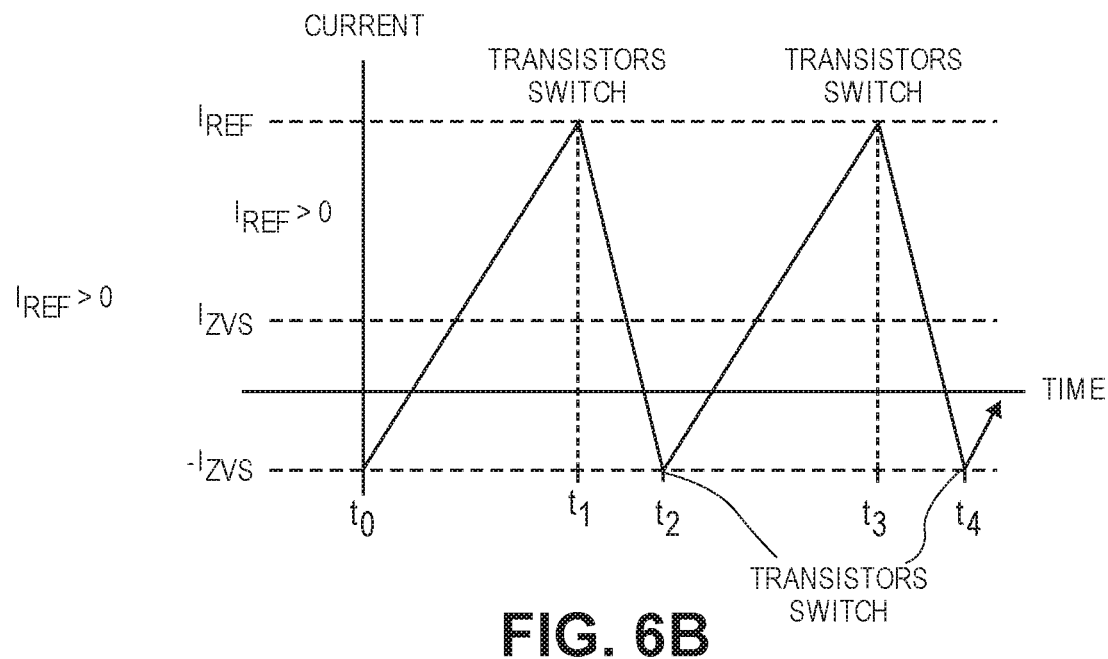
FIGS. 6B and 6C are plots of current flow through the hysteresis controller of FIG. 6A, in accordance with embodiments of the present disclosure.
Figure 6C:
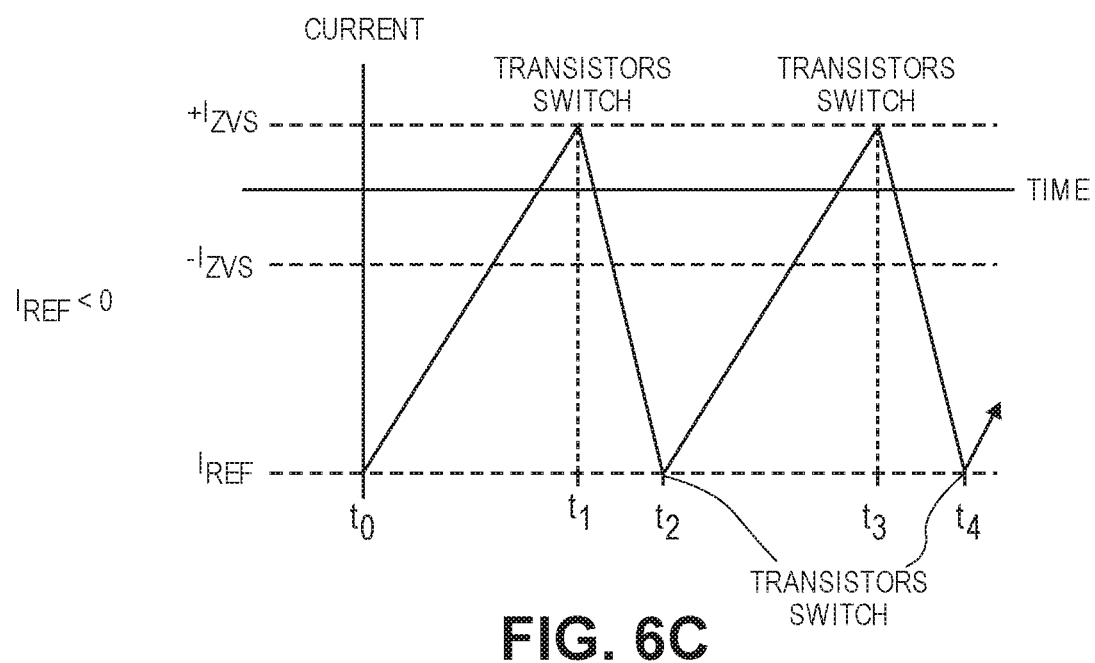

Referring to FIGS. 6B and 6C, plots of current flow through the hysteresis controller of FIG. 6A in accordance with embodiments of the present disclosure are shown. As is shown in FIG. 6B, a plot of current flow through a boost inductor is shown when a power stage is configured for boosting voltages, e.g., with a reference current $I_{REF}$ that is greater than zero. The hysteresis controller may operate transistors of the power stage at time $t_0$ to cause a current $I_L$ to flow through the boost inductor, thereby forming a magnetic field with energy stored therein. The current $I_L$ increases from a negative zero voltage switching current $-I_{ZVS}$ until reaching a value of the reference current $I_{REF}$ at time $t_1$, when the hysteresis controller operates the transistors to cause the current $I_L$ flowing through the boost inductor to decrease, thereby discharging the energy from the magnetic field. The current $I_L$ eventually falls below zero, i.e., reverses polarity, until the current $I_L$ reaches the negative zero voltage switching current $-I_{ZVS}$ at time $t_2$. The hysteresis controller then operates the transistors to cause the current $I_L$ flowing through the boost inductor to increase, thereby regenerating a magnetic field with energy stored therein, until the current $I_L$ reaches the value of the reference current $I_{REF}$ at time $t_3$. The hysteresis controller then operates the transistors again to cause the current $I_L$ to decrease, until the current $I_L$ reaches the negative zero voltage switching current $-I_{ZVS}$ at time $t_4$, and the hysteresis controller operates the transistors again to cause the current $I_L$ to begin to increase.

As is shown in FIG. 6C, a plot of current flow through a boost inductor is shown when a power stage is configured for stepping down voltages, e.g., with a reference current $I_{REF}$ that is less than zero. The hysteresis controller may operate transistors of the power stage at time $t_0$ to cause a current $I_L$ to flow through the boost inductor, thereby forming a magnetic field with energy stored therein. The current $I_L$ increases from the reference current $I_{REF}$ until reaching a value of the positive zero voltage switching current $+I_{ZVS}$ at time $t_1$, when the hysteresis controller operates the transistors to cause the current $I_L$ flowing through the boost inductor to decrease, thereby discharging the energy from the magnetic field. The current $I_L$ eventually falls below zero again, i.e., reverses polarity, until the current $I_L$ reaches the reference current $I_{REF}$ at time $t_2$. The hysteresis controller then operates the transistors to cause the current $I_L$ flowing through the boost inductor to increase, thereby regenerating a magnetic field with energy stored therein, until the current $I_L$ reaches the value of the positive zero voltage switching current $+I_{ZVS}$ at time $t_3$. The hysteresis controller then operates the transistors again to cause the current $I_L$ to decrease, until the current $I_L$ reaches the reference current $I_{REF}$ at time $t_4$, and the hysteresis controller operates the transistors again to cause the current $I_L$ to begin to increase.

As is shown in FIGS. 6A through 6C, the hysteresis controllers of the present disclosure may maintain zero voltage switching regardless of the direction of desired current flow therethrough, i.e., by causing transistors to switch based on reference currents that are selected based on an intended mode of operation. Furthermore, because the hysteresis controller acts upon sensed current information, zero-voltage-switching is maintained regardless of input voltage, output voltage, or circuit parameters such as inductance and capacitance. This capability differs from typical zero-voltage-switching controllers, which maintain ZVS only in a more limited operating range. Moreover, the hysteresis controllers of the present disclosure may have any configuration, and are not limited to the configurations shown in FIG. 3 or 6A.

The power converter units of the present disclosure may also be configured to charge a power source (e.g., a battery), such as when a propulsion motor is deenergized and spins down from an operating speed. For example, in a manner similar to regenerative braking, the spinning propeller of a propulsion motor may act as a generator to convert rotational energy to electrical energy, and to charge the battery thereby. Alternatively, the electrical resistance provided by power converter units when such units are not operating under power may accelerate the slowing of a propulsion motor and propeller thereby.

Figure 7:
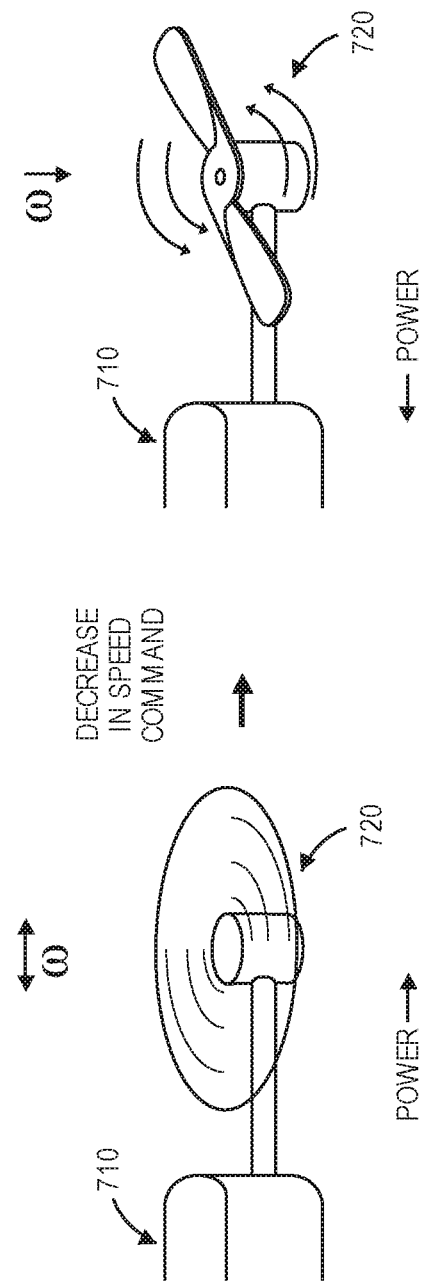
FIG. 7 is a view of aspects of one aerial vehicle having a power conversion unit in accordance with embodiments of the present disclosure.

Referring to FIG. 7, a view of aspects of one aerial vehicle 710 having a power conversion unit in accordance with embodiments of the present disclosure is shown. Except where otherwise noted, reference numerals preceded by the number "7" shown in FIG. 7 indicate components or features that are similar to components or features having reference numerals preceded by the number "6" shown in FIG. 6A, by the number "3" shown in FIG. 3, by the number "2" shown in FIG. 2, by the number "1" shown in FIGS. 1A and 1B.

As shown in FIG. 7, the aerial vehicle 710 includes a propulsion motor 720. The aerial vehicle 710 may be outfitted with a power conversion unit having one or more power modules of the present disclosure, and may provide electrical power at a high voltage level $V_{HIGH}$ to the propulsion motor 720. As is shown in FIG. 7, the propulsion motor 720 operates at a rotational velocity ω under power, when the transistors of the power modules are configured to operate in a forward-switching configuration. As is also shown in FIG. 7, when power to the propulsion motor 720 is cut off, the rotational velocity ω of the propulsion motor 720 begins to decrease. The transistors of the power modules may be configured to operate in a reverse-switching configuration, such that electrical power generated during the slowing of the propulsion motor may pass in reverse to one or more batteries or other power supplies aboard the aerial vehicle 710.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference circuits and components provided in discrete configurations, the systems and methods of the present disclosure are not limited to any of the specific circuits, components or configurations disclosed herein. Furthermore, although some of the embodiments disclosed herein reference a power conversion unit having four power modules, each having a power stage, the power conversion units disclosed herein are not limited to any number of power modules, and each of the power modules may have one or more power stages. In some embodiments, the power conversion units and/or power modules may include any number of other components, in addition to the components discussed herein, including one or more additional sensors, monitors or other components for determining voltage levels and/or current levels of various aspects of the respective systems or methods. Additionally, although some of the embodiments disclosed herein reference the use of power conversion units and/or power modules aboard unmanned aerial vehicles, the systems and methods of the present disclosure are not so limited, and may be used during the operation of any type or form of vehicle, including manned vehicles, unmanned vehicles, or any other type or form of vehicle, as well as in any system by which electrical power is desired at one or more predetermined voltage levels.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 4, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit (s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A vehicle comprising:
a battery;
a plurality of motors; and
a power conversion unit configured to receive electrical power from the battery and to provide electrical power to each of the motors, wherein the power conversion unit comprises:
a housing;
a plurality of power modules associated with the housing, wherein each of the power modules comprises:
a boost inductor;
a current sensor aligned to sense a current flowing through the boost inductor and to generate a voltage signal corresponding to the current flowing through the boost inductor;
a pair of transistors, wherein the pair of transistors comprises a first transistor aligned in series between the boost inductor and at least one of the motors and a second transistor aligned in series between the boost inductor and ground;
a gate driver, wherein the gate driver is configured to supply a gate voltage to switch on or off each of the pair of transistors;
an output capacitor in parallel with at least one of the motors;
an error amplifier, wherein a first input of the error amplifier is a reference voltage and a second input of the error amplifier is a voltage across the output capacitor, and wherein an output of the error amplifier is a voltage signal corresponding to a reference current; and
a first controller for controlling operations of the gate driver, wherein a first input of the first controller is the voltage signal corresponding to the reference current and a second input of the first controller is the voltage signal corresponding to the current flowing through the boost inductor sensed by the current sensor, and wherein an output of the first controller is a voltage signal to the gate driver for switching on one of the pair of transistors and for switching off one of the pair of transistors.

2. The vehicle of claim 1, wherein operating each of the motors requires electrical power from a first number of the power modules,
wherein the vehicle comprises a second number of the power modules, and
wherein the second number is at least one greater than the first number.

3. The vehicle of claim 1, wherein each of the power modules further comprises a first switch upstream of the boost inductor and a second switch downstream of the first transistor,
wherein each of the first switch and the second switch is in communication with a second controller in communication with each of the power modules, and
wherein the second controller is configured to determine a predetermined number of the power modules required to provide electrical power in response to demand.

4. A power conversion unit comprising:
a housing;
a controller;
a power supply;
a power module releasably associated with the housing, wherein the power module comprises:
a boost inductor;
a current sensor configured to sense a current passing through the boost inductor;
a pair of transistors;
a gate driver configured to operate each of the pair of transistors;
a capacitor;
an amplifier, wherein a first input to the amplifier is a first reference voltage associated with a first load on the power module, wherein a second input to the amplifier is a first output voltage of the power module, and wherein an output from the amplifier is a voltage signal representative of a first reference current determined based at least in part on a difference between the first reference voltage and the first output voltage of the power module; and
a controller, wherein a first input to the controller is the voltage signal representative of the first reference current, wherein a second input to the controller is a voltage signal representative of the current passing through the boost inductor, and wherein an output from the controller is a control signal for operating the gate driver based at least in part on a difference between the first reference current and the current passing through the boost inductor,
wherein a first one of the pair of transistors is aligned in series between the boost inductor and the load on the power module, and wherein a second one of the pair of transistors is aligned in series between the boost inductor and ground.

5. The power conversion unit of claim 4, wherein the control signal is configured to switch the first one of the pair of transistors off and to switch the second one of the pair of transistors on when the current flowing through the boost inductor equals a zero voltage switching current, and
wherein the control signal is configured to switch the first one of the pair of transistors on and to switch the second one of the pair of transistors off when the current flowing through the boost inductor equals the first reference current.

6. The power conversion unit of claim 4, wherein the controller is configured to select a switching frequency for the first one of the pair of transistors and the second one of the pair of transistors based at least in part on the difference between the first reference current and the current passing through the boost inductor, and
wherein the control signal is transmitted according to the switching frequency.

7. The power conversion unit of claim 4, wherein the controller comprises:
a first comparator configured to receive the first input to the controller and the second input to the controller;
a second comparator configured to receive the second input to the controller and a voltage signal corresponding to a negative zero voltage switching current;
a third comparator configured to receive the first input to the controller and the second input to the controller;
a fourth comparator configured to receive the second input to the controller and a voltage signal corresponding to a positive zero voltage switching current; and
a latch configured to generate the control signal based at least in part on at least one of an output of the first comparator, an output of the second comparator, an output of the third comparator and an output of the fourth comparator,
wherein the control signal instructs the gate driver to switch off the first one of the pair of transistors and to switch on the second one of the pair of transistors if the output of the first comparator indicates that the current passing through the boost inductor is less than the first reference current and if the output of the second comparator indicates that the current passing through the boost inductor is less than the negative zero voltage switching current, and
wherein the control signal instructs the gate driver to switch on the first one of the pair of transistors and to switch off the second one of the pair of transistors if the output of the third comparator indicates that the current passing through the boost inductor is greater than the reference current and if the output of the fourth comparator indicates that the current passing through the boost inductor is greater than the positive zero voltage switching current.

8. The power conversion unit of claim 4, wherein the power module comprises a first isolation switch, a second isolation switch and a power stage in series between the first isolation switch and the second isolation switch, and
wherein the power stage comprises the boost inductor, the current sensor, the pair of transistors, the gate driver, the capacitor, the amplifier and the controller.

9. The power conversion unit of claim 8,
wherein the first isolation switch is a first high-side switch in communication with the controller, and
wherein the second isolation switch is a second high-side switch in communication with the controller.

10. The power conversion unit of claim 4, wherein the first one of the pair of transistors is configured to be energized by a gate voltage from the gate driver, and
wherein the second one of the pair of transistors is configured to be energized by the gate voltage from the gate driver.

11. The power conversion unit of claim 4, wherein the power conversion unit is configured to generate up to a maximum output voltage based on a nominal voltage of the power supply.

12. The power conversion unit of claim 11, wherein the nominal voltage of the power supply is within a range of approximately forty-eight volts and approximately sixty volts, and
wherein the maximum output voltage of the power conversion unit is approximately one hundred fifty volts.

13. The power conversion unit of claim 4, wherein the power conversion unit is configured for mounting in association with an aerial vehicle having at least one propulsion motor.

14. The power conversion unit of claim 4, wherein the power module has a first dimension of approximately two inches and a second dimension of approximately six inches.

15. The power conversion unit of claim 4, wherein the power conversion unit comprises a first number of the power module, and
wherein the first number is at least four.

16. The power conversion unit of claim 15, wherein the power conversion unit is provided in association with at least one electrical load,
wherein the electrical load requires a second number of the power module for operation, and
wherein the first number is greater than the second predetermined number by at least one.

17. The power conversion unit of claim 4, wherein the power module further comprises at least one of a first overcurrent comparator at the second input to the controller or a second overcurrent comparator at the second one of the pair of transistors, and
wherein the gate driver is configured to switch off each of the first transistor and the second transistor in response to an overcurrent signal from one of the first overcurrent comparator or the second overcurrent comparator.

18. A power module comprising:
an inductor;
a current sensor aligned to sense a current flowing through the inductor;
a pair of transistors, wherein the pair of transistors comprises a first transistor aligned in series between the inductor and at least one load and a second transistor aligned in series between the inductor and ground;
a gate driver, wherein the gate driver is configured to switch on or off each of the transistors;
a capacitor in parallel with the at least one load;
an amplifier, wherein a first input of the amplifier is a reference voltage and a second input of the amplifier is a voltage across the capacitor, and wherein an output of the amplifier is a signal corresponding to a reference current; and
a controller for controlling operations of the gate driver, wherein a first input of the controller is the signal corresponding to the reference current of the output of the amplifier and a second input of the controller is a signal corresponding to the current flowing through the inductor sensed by the current sensor, and wherein an output of the controller is a control signal to the gate driver for switching off or on at least one of the pair of transistors.

19. The power module of claim 18, further comprising a first high-side switch upstream of the inductor and a second high-side switch between the capacitor and the at least one load.

20. The power module of claim 18, wherein the power module is configured to perform a method comprising:
receiving, at the first high-side switch, electrical power from a direct current power source;
sensing, by the current sensor, current flowing through the inductor;
comparing, by the amplifier, the voltage level across the capacitor to the reference voltage;
providing, by the amplifier, the signal corresponding to the reference current to the controller, wherein the signal corresponding to the reference current is proportional to a difference between the voltage level across the capacitor and the reference voltage;
determining, by the controller, that the reference current exceeds the current flowing through the inductor;
providing, by the controller, a control signal to the gate driver; and
switching, by the gate driver, the first transistor and the second transistor in response to the control signal.

* * * * *